US008576063B2

(12) United States Patent
Jo et al.

(10) Patent No.: US 8,576,063 B2
(45) Date of Patent: Nov. 5, 2013

(54) SYSTEM AND METHOD FOR TRACKING POSITION OF MOVING OBJECT

(75) Inventors: Jung Hee Jo, Daejeon (KR); Min Soo Kim, Daejeon (KR); Kwang Soo Kim, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 734 days.

(21) Appl. No.: 12/743,399
(22) PCT Filed: Jun. 12, 2008
(86) PCT No.: PCT/KR2008/003296
§ 371 (c)(1),
(2), (4) Date: May 18, 2010
(87) PCT Pub. No.: WO2009/075431
PCT Pub. Date: Jun. 18, 2009

(65) Prior Publication Data
US 2010/0245076 A1 Sep. 30, 2010

(30) Foreign Application Priority Data
Dec. 13, 2007 (KR) .................. 10-2007-0130240

(51) Int. Cl.
G08B 1/08 (2006.01)
(52) U.S. Cl.
USPC ............. 340/539.1; 340/539.13; 340/539.23; 340/572.1
(58) Field of Classification Search
USPC ............... 340/572.1, 539.1, 539.13, 539.21, 340/539.11, 539.23; 707/E17.014, 707/E17.044, E17.005, 769, 802
See application file for complete search history.

(56) References Cited
U.S. PATENT DOCUMENTS
6,529,164 B1 *  3/2003  Carter ........................... 342/463
7,126,951 B2 * 10/2006  Belcea et al. ................ 370/400
(Continued)

FOREIGN PATENT DOCUMENTS
KR  1020060082474 A   7/2006
KR  1020060108143 A  10/2006

OTHER PUBLICATIONS
Radim Zemek, et al; "An Effect of Anchor Nodes Placement on a Target Location Estimation Performance", Tencon 2006, 2006 IEEE Region 10 Conference, Nov. 14-17, 2006, pp. 1-4.
(Continued)

Primary Examiner — Eric M Blount
(74) Attorney, Agent, or Firm — Ladas & Parry LLP

(57) ABSTRACT

The present invention relates to a system and method for tracking the position of a moving object. A system for tracking the position of a moving object includes: WSNs composed of a plurality of sensor nodes, each generating connection release information representing that the connection between the corresponding WSN and a moving object having a moving node serving as a sensor node attached thereto has released if having perceived the departure of the moving object; base stations managing the plurality of WSNs and collecting position information on the plurality of sensor nodes; a node information database storing the position information on the plurality of sensor nodes collected by the plurality of base stations; middleware checking the current position information on the moving object stored in the node information database if receiving the connection release information through any of the plurality of base stations, and deleting the current position information on the moving object stored in the node information database if the checked current position of the moving object is in a WSN having perceived the departure of the moving object; and a moving-object tracking application provided with the position information on the moving object by the middleware to track the position of the moving object. According to the present invention, it is possible to efficiently process information of a WSN managed by each base station in middleware managing a plurality of base stations, thereby improving the accuracy in tracking the position of a moving object.

13 Claims, 5 Drawing Sheets

(56) References Cited

U.S. PATENT DOCUMENTS

| | | | |
|---|---|---|---|
| 7,203,497 B2 * | 4/2007 | Belcea | 455/446 |
| 7,242,306 B2 * | 7/2007 | Wildman et al. | 340/573.1 |
| 7,312,752 B2 * | 12/2007 | Smith et al. | 342/464 |
| 7,532,113 B2 * | 5/2009 | Horvitz et al. | 340/539.13 |
| 7,616,156 B2 * | 11/2009 | Smith et al. | 342/451 |
| 2005/0055417 A1 * | 3/2005 | Reich et al. | 709/208 |
| 2006/0087425 A1 * | 4/2006 | Haeberlen et al. | 340/539.13 |
| 2007/0132586 A1 | 6/2007 | Plocher et al. | |

OTHER PUBLICATIONS

Mr. Vimal Joy, et al; "Smart Spaces: Indoor Wireless Location Management System", Next Generation Mobile Applications, Services and Technologies, 2007. Ngmast '07. The 2007 International Conference on, Sep. 12-14, 2007, pp. 261-266.

International Search Report: PCT/KR2008/003296.

* cited by examiner

SYSTEM AND METHOD FOR TRACKING POSITION OF MOVING OBJECT

TECHNICAL FIELD

The present invention relates to a system and method for tracking the position of a moving object. More specifically, the present invention relates to a system and method for tracking the position of a moving object that moves between floors in a building.

The present invention was supported by the IT R&D program of MIC/IITA [2006-S-022-02, Development of USN Middleware Platform Technology].

BACKGROUND ART

In the related art, a position measurement can be made through various methods using GPS, RSSI (received signal strength indication), infrared rays, and ultrasonic waves.

Since the error of, for example, a position measuring technique using GPS is in the range of about 10 to 100 meters, it is difficult to apply the position measuring technique using GPS to application fields requiring precise position information.

In order to cope with such problems of the position measuring technique using GPS, GPS has been installed in a mobile phone for example, and various services using position information have been implemented. However, since GPS is usable only outdoors, it is difficult to accurately measure the ID and position of a person or object in a building.

Further, currently, it is possible to recognize a person or object indoors by techniques using an RFID tag, for example. However, it is possible to know that a tag exists in a RFID range, but it is not possible to know the precise position of the tag.

Similarly, a wireless local area network (WLAN) exhibits an error of several meters. A technique using ultrasonic waves has high accuracy and a narrow measurement range of several meters.

Recently, with the rapid development of sensor network techniques, the sensor network technique has been integrated with a technique for measuring the position of a moving object. Accordingly, objects of position measurement have been expanded from huge objects such as buildings and ships to small objects such as vehicles and persons. In other words, the number of objects being subjected to position measurement is increasing, and the sizes of the objects are decreasing. In keeping with this trend, research on techniques for recognizing the position of an object in real time and tracking the moving path of the object has been being carried out in many standardization organizations, and a representative example thereof is a WSN (wireless sensor network) in which a plurality of sensor nodes form a network in a wireless manner.

The WSN needs not only wireless communication and sensor network techniques but also various software techniques such as a routing protocol, and requires additional techniques to measure a position. For example, it is possible to measure the position of each moving node of the WSN by using RSSI (received signal strength indication). In this case, easy application to distance measurement is possible without additional hardware. An example of these application fields is a property position tracking system that finds the position of a sensor node attached to property, thereby finding the current position of the property.

Research on position tracking using a sensor network in various applications is being actively carried out. However, an attempt to seamlessly track the position of an object moving among many floors indoors has not yet been made.

FIG. 1 is a view schematically illustrating a general system for tracking a position in a building.

Referring to FIG. 1, a general system for tracking a position includes a moving-object tracking application 130, base stations 150, stationary nodes 173, and moving nodes 175.

The moving-object tracking application 130 provides a program for monitoring the positions of moving objects in real time, and tracks the moving nodes 175 by using position information on moving nodes 175 received through the base stations 150.

The base stations 150 are installed at every floor of the building. Each base station 150 receives position information and connection information from the moving nodes 175 distributed on a corresponding floor in real time, and stores the received information.

The stationary nodes 173 are installed on the walls or ceilings on individual floors, and serve as reference points required to calculate the positions of the moving nodes 175. In this case, the positions of the stationary nodes 173 are fixed at predetermined values.

Further, the stationary nodes 173 transmit or receive RSSI to or from the moving nodes 175, and provide the base stations 150 with basic position information that is used to calculate the positions of the moving nodes 175.

The moving nodes 175 are manufactured in a portable form and attached to property or persons that come in and out of the building. When the moving nodes enter WSNs managed by the base stations 150, the moving nodes transmit position information and connection information to the base stations 150.

Such a general system for tracking a position receives the position information and connection information, which are obtained by the stationary nodes 173 while the stationary nodes transmit and receive RSSI to/from the moving nodes 175, through the stationary nodes 173. Accordingly, the system can track the positions of the moving nodes 175.

Further, when a moving node 175 leaves a floor where the moving node is currently located (hereinafter referred to as a current floor) and arrives on another floor, a base station 150 of the current floor where the moving node 175 stayed receives connection release information on the moving node 175 from a WSN of the current floor, and thus recognizes that the moving node 175 no longer exists on the current floor.

Subsequently, a base station (not shown) of another floor where the moving node 175 has arrived receives connection set information on the moving node 175 from a WSN of another floor, and thus recognizes that the moving node 175 joins and is operating in the WSN of the other floor.

In a case where the connection release information on the current floor where the moving node 175 has stayed and the connection set information on the other floor where the moving node 175 arrives are sequentially transmitted, it is possible to track the precise position of the moving node 175. However, if a temporal difference where the connection set information is transmitted before the connection release information is transmitted due to variable conditions (for example, the density or number of a plurality of moving nodes, or interference) occurs, there is a problem in that the moving node 175 is temporarily recognized to be simultaneously located on a plurality of floors.

Therefore, in order to cope with the above-mentioned problem, a general WSN in the related art requires a method for preventing errors in position tracking caused by the temporal difference between a time point when the connection set information on the moving node 175 is transmitted and a time point when the connection release information on the moving node 175 is transmitted when the moving node 175 moves among a plurality of floors.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a system and method for tracking the position of a moving object moving among a plurality of floors in a building where a WSN is constructed.

Technical Solution

An exemplary embodiment of the present invention provides a system for tracking the position of a moving object. The system includes: wireless sensor networks composed of a plurality of sensor nodes, each generating connection release information representing that a connection between the corresponding WSN and a moving object having a moving node serving as a sensor node attached thereto has released if having perceived the departure of the moving object; base stations managing the plurality of wireless sensor networks and collecting position information on the plurality of sensor nodes; a node information database storing the position information on the plurality of sensor nodes collected by the plurality of base stations; middleware checking the current position information on the moving object stored in the node information database if receiving the connection release information through any of the plurality of base stations, and deleting the current position information on the moving object stored in the node information database if the checked current position of the moving object is in a wireless sensor network having perceived the departure of the moving object; and a moving-object tracking application provided with the position information on the moving object by the middleware to track the position of the moving object.

Another embodiment of the present invention provides a method of tracking the position of a moving object. The method includes: if a moving object having a moving node being a sensor node attached thereto has left a WSN, generating connection release information representing that the connection between the moving node and the WSN has been released; searching for current position information on the moving object stored in a node information database that stores position information on a plurality of moving nodes and a plurality of stationary node, and determining whether the searched current position of the moving object is in the WSN; and if the checked current position of the moving object is in the WSN, deleting the position information on the moving node attached to the moving object stored in the node information database.

Yet another embodiment of the present invention provides a method of tracking the position of a moving object. The method includes: if a moving object having a moving node being a sensor node attached thereto has entered a WSN, generating connection generation information representing that the moving object has been connected to the WSN; and searching for current position information on the moving object in a node information database that stores position information on a plurality of moving nodes and a plurality of stationary nodes, and updating the searched current position information of the moving object in the node information database with position information included in the connection generation information.

Advantageous Effects

According to the exemplary embodiments of the present invention, it is possible to efficiently process information of a WSN that is managed by each base station in middleware managing a plurality of base stations, thereby improving the accuracy in tracking the position of a moving object.

MODE FOR THE INVENTION

Figure 1:
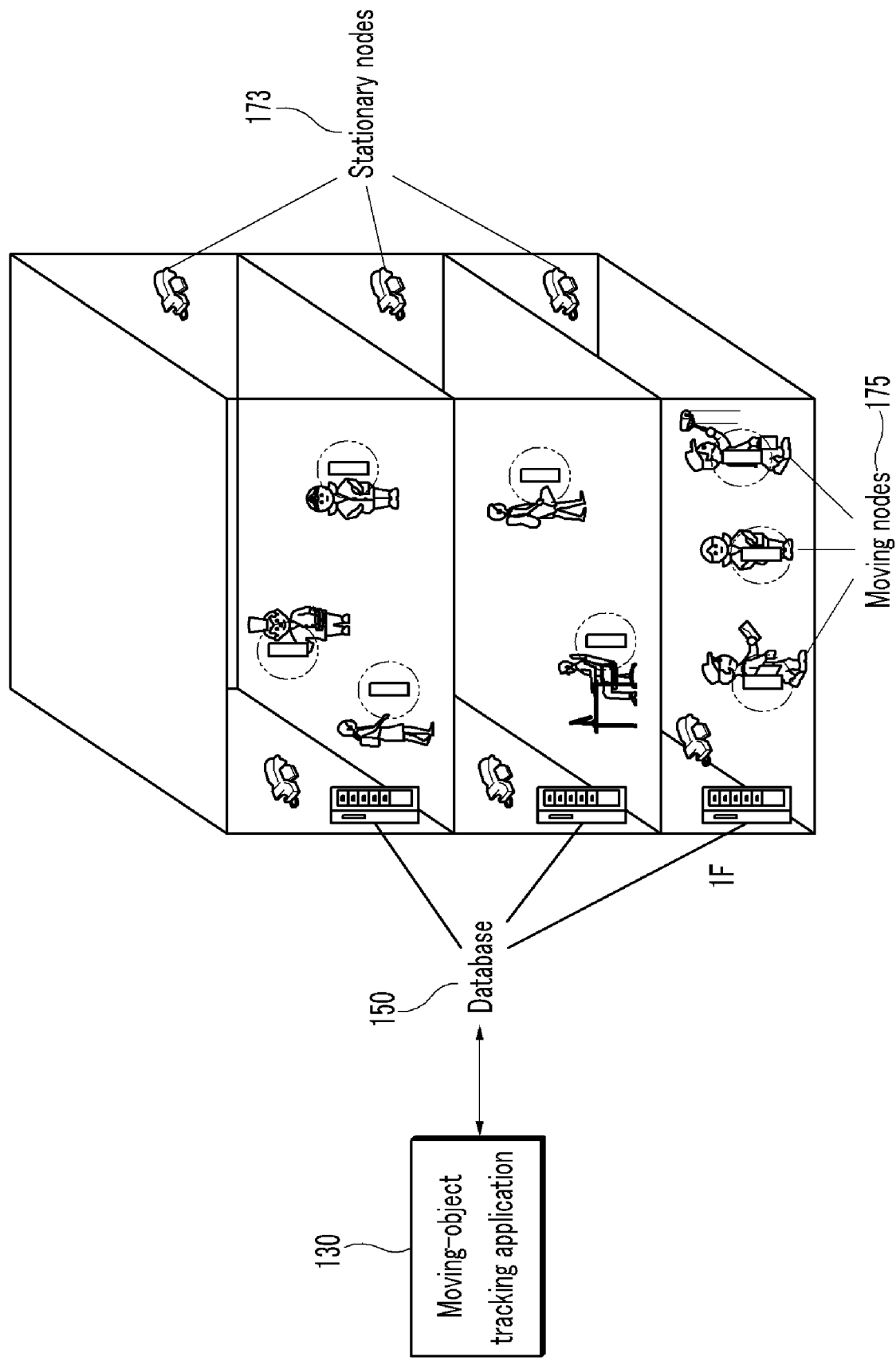
FIG. 1 is a view schematically illustrating a general system for tracking a position in a building.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprise" and/or "comprising" specify the presence of stated features, integers, steps, operations, elements, and/or components, but do not preclude the presence or addition of one or more other features, integers, steps, operations, elements, components, and/or groups thereof.

Figure 2:
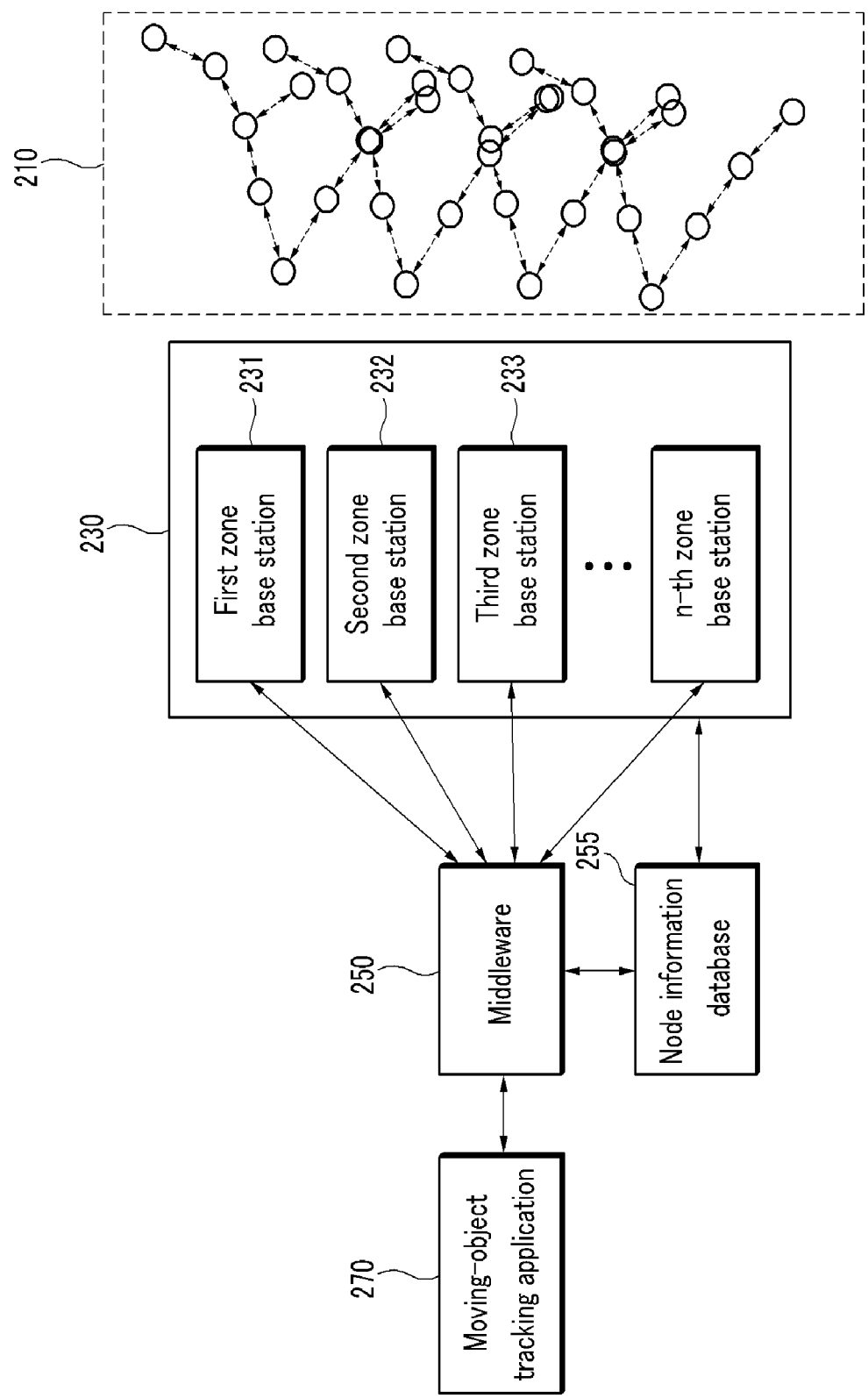
FIG. 2 is a view schematically illustrating the configuration of a system for tracking a position according to an exemplary embodiment of the present invention.
Figure 3:
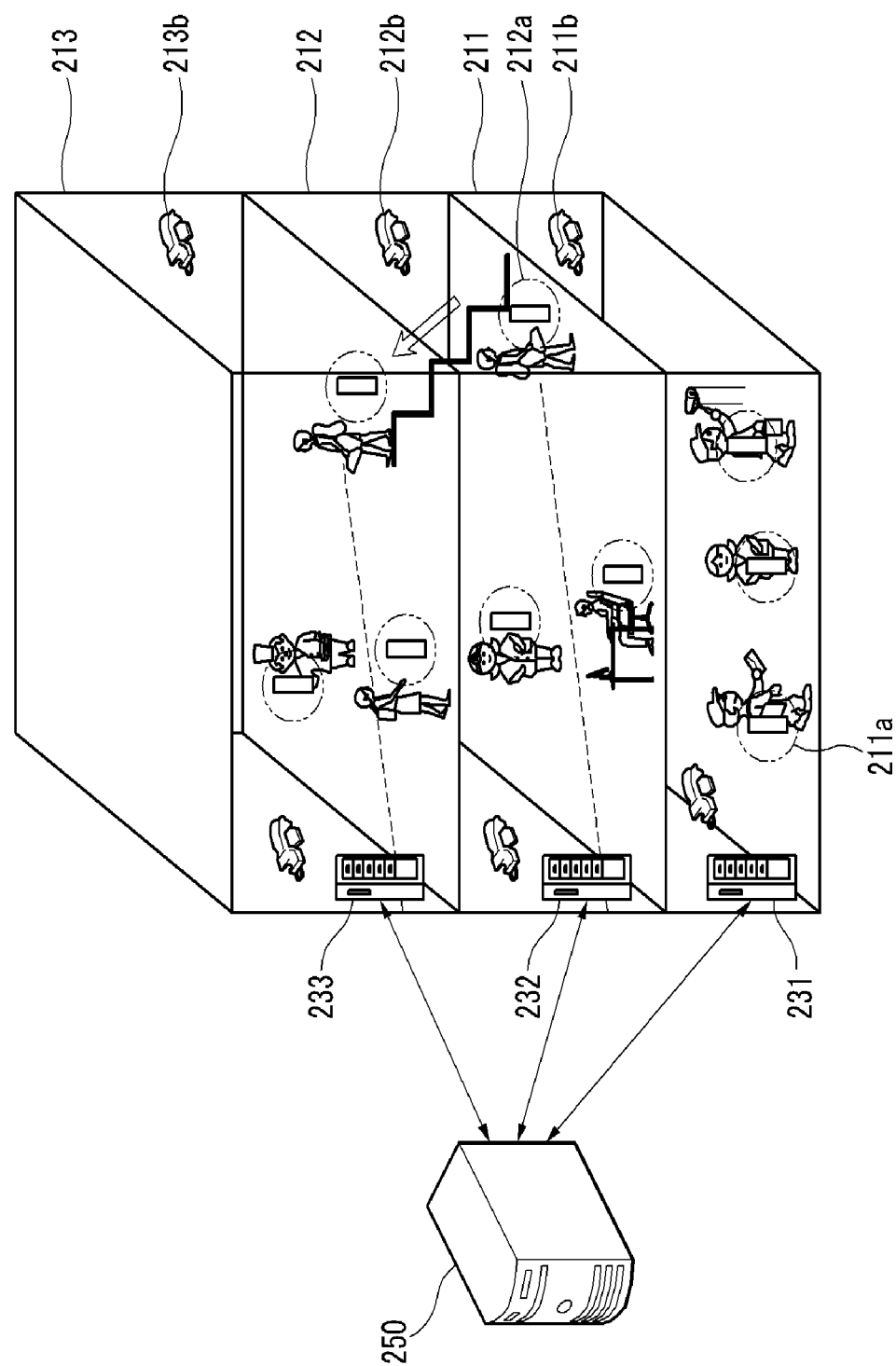
FIG. 3 is a view illustrating the layout of components of the system, which is constructed in a building for tracking a position, according to an exemplary embodiment of the present invention.

FIG. 2 is a view schematically illustrating the configuration of a system for tracking a position according to an exemplary embodiment of the present invention, and FIG. 3 is a view illustrating the layout of components of a system, which is constructed in a building for tracking a position, according to the exemplary embodiment of the present invention.

Referring to FIGS. 2 and 3, a system for tracking a position according to an exemplary embodiment of the present invention includes a WSN 210, base stations 230, WSN middleware (hereinafter, referred to as "middleware") 250, a node information database 255, and a moving-object tracking application 270.

The WSN 210 is a network composed of sensor nodes that include a plurality of moving nodes (211a, 212a, . . . ) and a plurality of stationary nodes (211b, 212b, 213b, . . . ). Here, a network (211, 212, or 213) may be formed by a moving node and a stationary node.

Further, when moving objects having the moving nodes (211a, 212a, . . . ) attached thereto enter a zone managed by the WSN, the WSN 210 senses connection of the moving nodes (211a, 212a, . . . ), generates connection generation messages, and transmits the messages to the base stations 230.

Furthermore, when the moving objects having the moving nodes (211a, 212a, . . . ) attached thereto leave the zone managed by the WSN, the WSN 210 senses the departure of the moving nodes (211a, 212a, . . . ), generates connection release information representing that the connection between the moving nodes (211a, 212a, . . . ) and the WSN 210 where the moving nodes are located is released, and transmits the connection release information to the base stations 230.

The moving nodes (211a, 212a, . . . ) are manufactured in a portable form and are attached to property or persons that come in and out of the building. When the moving nodes enter a zone managed by the base stations 230, the moving nodes transmit or receive RSSI (received signal strength indication) to or from the stationary nodes (211b, 212b, 213b,).

The stationary nodes (211b, 212b, 213b, . . . ) are installed on walls or ceilings on every floor, and serve as reference points required to calculate the positions of the moving nodes (211a, 212a, . . . ). Further, the stationary nodes transmit or receive RSSI to or from the moving nodes (211a, 212a, . . . ) and provide the base stations 230 with basic position information that is used to calculate the positions of the moving nodes (211a, 212a, . . . ).

The base stations 230 are located between the middleware 250 and the WSN 210, they collect the position information and connection information from the sensor nodes in the WSN 210, and they transmit the collected information to the middleware 250.

Further, the base stations 230 receive the connection generation messages from a WSN 210 that has sensed the connection of the moving nodes (211a, 212a, . . . ), and perceive through the connection generation message that the moving nodes (211a, 212a, . . . ) have entered the WSN 210.

Furthermore, the base stations 230 receive the connection release information from a WSN 210 that has sensed the departure of the moving nodes (211a, 212a, . . . ), and perceive through the connection release information that the moving nodes (211a, 212a, . . . ) have left the WSN 210.

The middleware 250 is located between the moving-object tracking application 270 and the base stations 230, collects and filters the position information and connection information on the sensor nodes of the WSN 210 connected to the base stations 230, and provides the filtered information to the moving-object tracking application 270. In this case, the middleware 250 stores the position information and connection information on the sensor nodes of the WSN 210 in the node information database 255.

Further, when the middleware 250 receives the connection release information, it confirms that the moving nodes (211a, 212a, . . . ) have left the WSN 210.

Furthermore, the middleware 250 searches the node information database 255 to check the current position information on the moving nodes (211a, 212a, . . . ). When the checked current positions of the moving nodes (211a, 212a, . . . ) are in the WSN that has sensed the departure of the moving nodes, the middleware deletes the position information on the moving nodes (211a, 212a, . . . ) stored in the node information database 255.

In addition, when the middleware 250 receives the connection generation information, it confirms that the moving nodes (211a, 212a, . . . ) have entered the WSN 210, searches the node information database 255 to check the current positions of the moving nodes (211a, 212a, . . . ), and updates the position information on the moving nodes (211a, 212a, . . . ) stored in the node information database 255 with the position information on the moving nodes (211a, 212a, . . . ) included in the connection generation information.

The node information database 255 is a database storing the position information and connection information on the sensor nodes.

The moving-object tracking application 270 provides a program for monitoring the positions of moving objects in real time, receives the position information on the moving nodes (211a, 212a, . . . ) from the middleware 250, and uses the position information to track the positions of the moving nodes (211a, 212a, . . . ).

Hereinafter, a process of tracking the positions of moving objects for use in the system for tracking a position according to the exemplary embodiment of the present invention will be described in detail with reference to the drawings. In this exemplary embodiment of the present invention, for ease of explanation, a description will be made on the assumption that the WSN and the base station managing the WSN are constructed on every floor, and that a moving object having a moving node 212a attached thereto moves from a second zone WSN 212 constructed on the second floor to a third zone WSN 213 constructed on the third floor. For ease of explanation, a description will be made with reference to FIG. 3 illustrated above.

Figure 4:
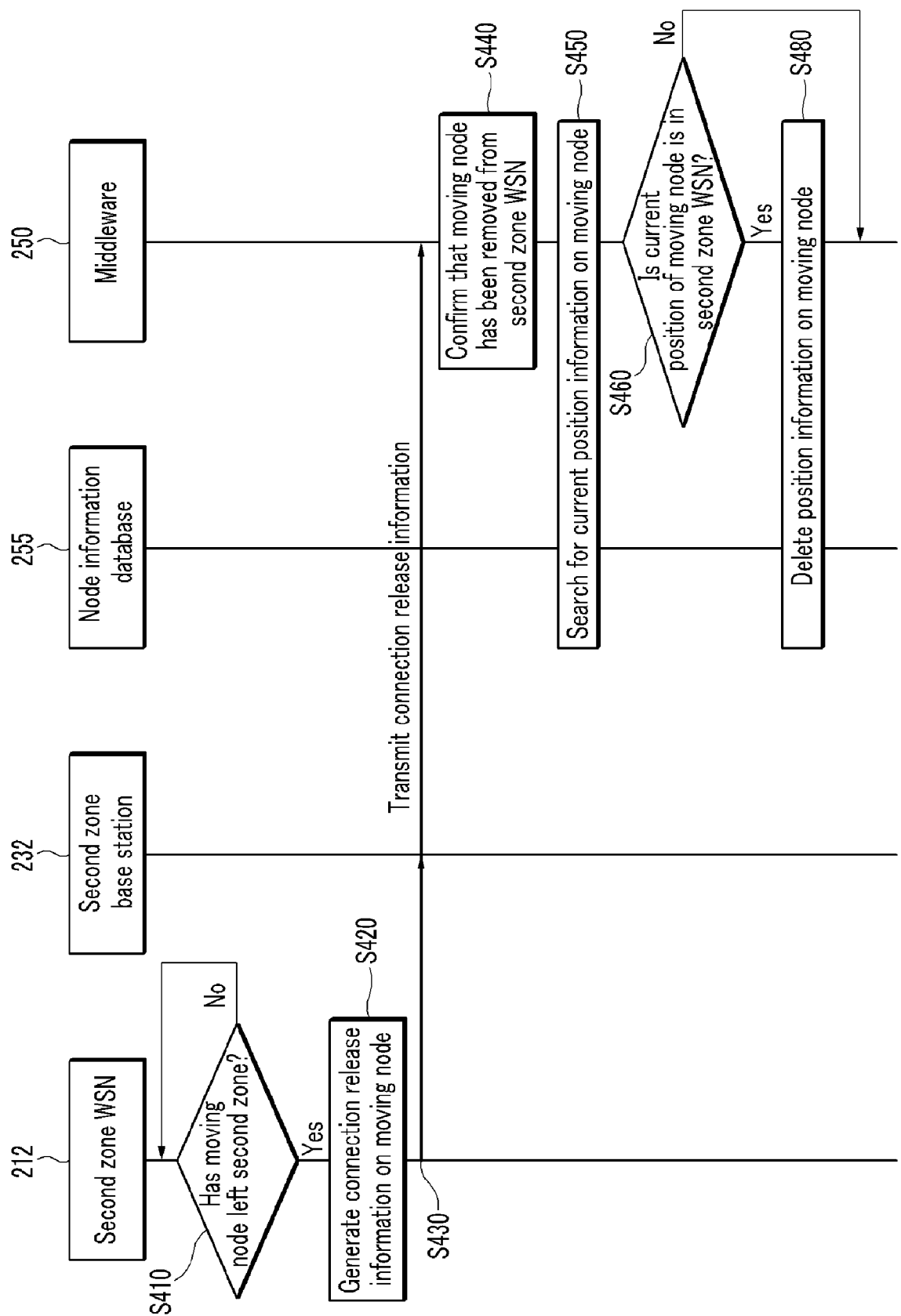
FIG. 4 is a flowchart illustrating the operation of the system for tracking a position according to the exemplary embodiment of the present invention when a moving object has left a current floor to another floor.

FIG. 4 is a flowchart illustrating the operation of a system for tracking a position according to the exemplary embodiment of the present invention when a moving object leaves a current floor and arrives on another floor.

Referring to FIGS. 3 and 4, the operation of the system for tracking a position according to the exemplary embodiment of the present invention when a moving object having a moving node 212a attached thereto moves from the second zone WSN 212 constructed on the second floor to the third zone WSN 213 constructed on the third floor will be described in detail. Here, for ease of explanation, the moving object is referred to as the moving node 212a.

First, the second zone WSN 212 determines whether the moving node 212a has left the second zone (S410). If it is determined that the moving node 212a has left the second zone, the second zone WSN generates connection release information on the moving node 212a (S420) and transmits the connection release information to the middleware 250 through a second zone base station 232 (S430).

Next, the middleware 250 confirms that the moving node 212a has moved from the second zone WSN 212 through the received connection release information on the moving node 212a (S440), and searches the node information database 240 for the current position of the moving node 212a (S450).

Then, the middleware 250 determines whether the current position of the moving node 212a is in the second zone WSN 212 where the moving node was located (S460). If it is determined that the set current position of the moving node 212a is in the second zone WSN 212, the middleware 250 deletes the position information on the moving node 212a stored in the node information database 255 (S480).

If it is determined in step 5460 that the current position of the moving node 212a is not in the second zone WSN 212, the middleware 250 determines that the position information on the moving node 212a stored in the node information database 240 has been updated with new position information on the moving node 212a, and thus does not delete the position information on the moving node 212a from the node information database 240.

Figure 5:
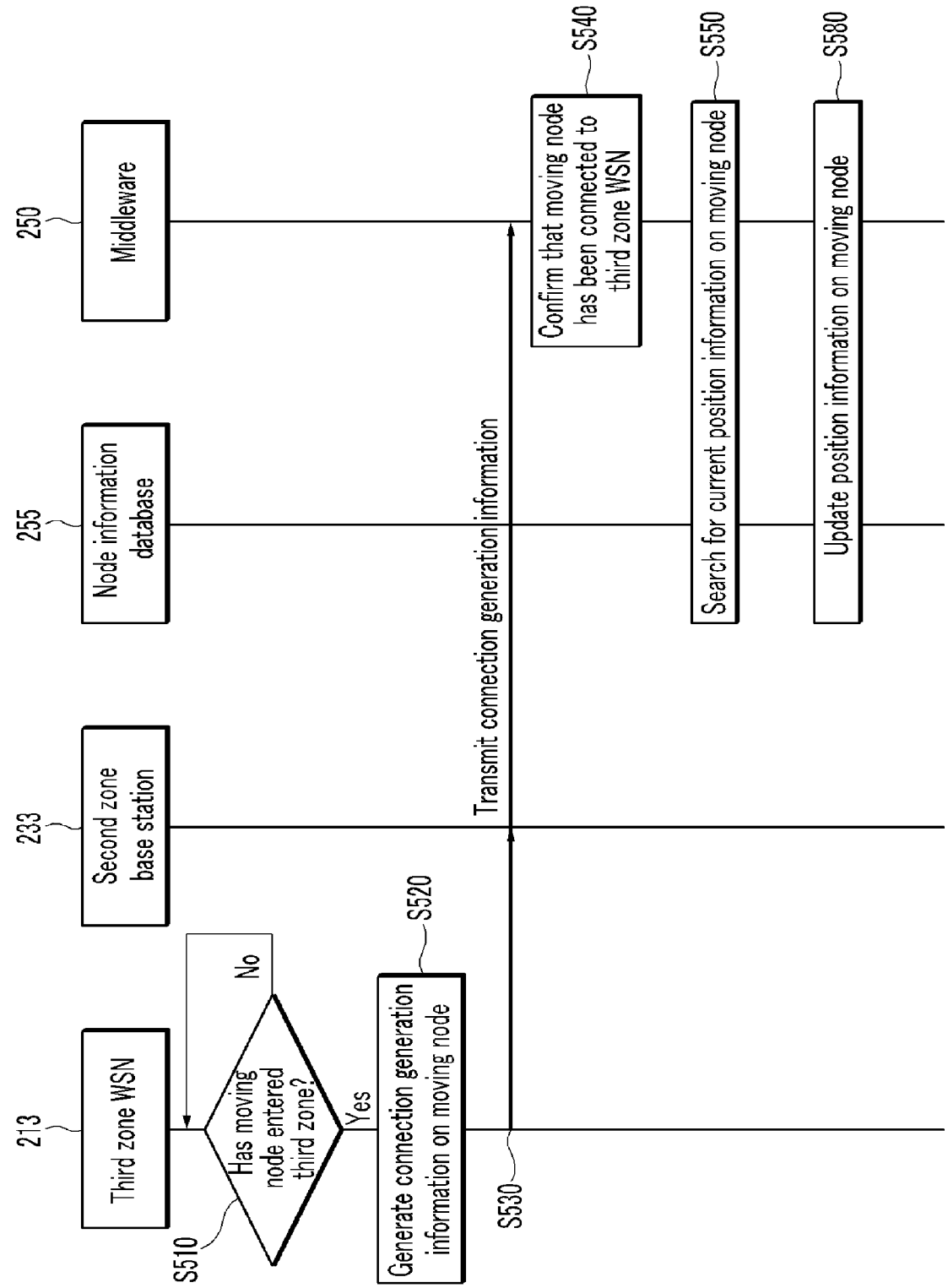
FIG. 5 is a flowchart illustrating the operation of the system for tracking a position according to the exemplary embodiment of the present invention when a moving object having left a current floor has entered another floor.

FIG. 5 is a flowchart illustrating the operation of a system for tracking a position according to the exemplary embodiment of the present invention when a moving object having left a current floor has entered another floor.

Referring to FIGS. 3 and 5, the operation of a system for tracking a position according to the exemplary embodiment of the present invention when the moving node 212a having stayed in the second zone WSN 212 on the second floor enters the third zone WSN 213 on the third floor will be described in detail.

First, the third zone WSN 213 determines whether the moving node 212a has entered the third zone (S510). If it is determined that the moving node 212a has entered the third zone, the third zone WSN generates connection generation information on the moving node 212a (S520) and transmits the connection generation information to the middleware 250 through a third zone base station 233 (S530).

Next, the middleware 250 confirms that the moving node 212a has connected to the third zone WSN 213 through the received connection generation information on the moving node 212a (S540), and searches the node information database 240 to determine the current position of the moving node 212a (S550).

Then, the middleware 250 updates the current position of the moving node 212a searched from the node information database 255 with the position information on the moving node 212a included in the connection generation information (S580).

Therefore, according to the exemplary embodiments of the present invention, it is possible to efficiently process information of a WSN managed by each base station in middleware managing a plurality of base stations, thereby improving the accuracy in tracking the position of a moving object.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A system for tracking the position of a moving object, the system comprising:
WSNs (wireless sensor networks) composed of a plurality of sensor nodes, each generating connection release information representing that a connection between the corresponding WSN and a moving object having a moving node serving as a sensor node attached thereto has released if having perceived the departure of the moving object; base stations managing the plurality of WSNs and collecting position information on the plurality of sensor nodes;
a node information database storing the position information on the plurality of sensor nodes collected by the plurality of base stations;
middleware checking the current position information on the moving object stored in the node information database if receiving the connection release information through any of the plurality of base stations, and deleting the current position information on the moving object stored in the node information database if the checked current position of the moving object is in a WSN having perceived the departure of the moving object; and
a moving-object tracking application provided with the position information on the moving object by the middleware to track the position of the moving object.

2. The system of claim 1, wherein if a WSN having perceived the moving object generates connection generation information representing that the moving object has been connected to the corresponding WSN, the middleware receives the connection generation information through a base station corresponding to the WSN and updates the current position information on the moving object stored in the node information database with position information on the moving object included in the connection generation information.

3. The system of claim 2, wherein if the checked current position of the moving object is in another WSN other than the WSN having perceived the departure of the moving object, the middleware maintains the position information on the moving object stored in the node information database.

4. The system of claim 3, wherein the plurality of WSNs consist of a plurality of sensor nodes including a plurality of moving nodes and a plurality of stationary nodes, the plurality of moving nodes are manufactured in a portable form and are attached to property or persons that come in and out of a building, and the plurality of stationary nodes are installed on walls or ceilings at every floor.

5. The system of claim 4, wherein in a WSN, a stationary node transmits or receives an RSSI (received signal strength indication) to or from a moving node attached to the moving object and provides basic position information for calculating the position of the moving object to a base station.

6. A method of tracking the position of a moving object, the method comprising: if a moving object having a moving node being a sensor node attached thereto has left a WSN, generating connection release information representing that the connection between the moving node and the WSN has been released;
searching for current position information on the moving object stored in a node information database that stores position information on a plurality of moving nodes and a plurality of stationary nodes, and determining whether the searched current position of the moving object is in the WSN; and
if the checked current position of the moving object is in the WSN, deleting the position information on the moving node attached to the moving object stored in the node information database.

7. The method of claim 6, wherein in the searching of the current position information, if the checked current position of the moving object is in another WSN other than the WSN, the position information on the moving object stored in the node information database is maintained.

8. The method of claim 7, wherein in the generating of the connection release information, the departure of the moving object is perceived through a stationary node serving as a reference point required to calculate the position of the moving node that is manufactured in a portable form and is attached to a movable object such as property or persons that come in and out of a building.

9. The method of claim 8, wherein in the generating of the connection release information, the stationary node transmits or receives an RSSI (received signal strength indication) to or from the moving node attached to the moving object to perceive the departure of the moving node attached to the moving object.

10. A method of tracking the position of a moving object, the method comprising:
if a moving object having a moving node being a sensor node attached thereto has left a first WSN and entered a second WSN, sensing departure of the moving node from the first WSN and generating connection release information representing that the connection between the moving node and the first WSN has been released, and generating connection generation information representing that the moving object has been connected to the second WSN;

searching for current position information on the moving object stored in a node information database, determining whether the searched current position of the moving object is in the first WSN, and if the checked current position of the moving object is in the WSN, deleting the position information on the moving node attached to the moving object stored in the node information database; and updating the searched current position information of the moving object in the node information database with position information included in the connection generation information.

11. The method of claim 10, wherein in the generating of the connection generation information, the entrance of the moving object is perceived through a stationary node serving as a reference point required to calculate the position of the moving node that is manufactured in a portable form and is attached to a movable object such as property or persons that come in and out of a building.

12. The method of claim 11, wherein, in the generating of the connection generation information, the stationary node transmits or receives an RSSI (received signal strength indication) to or from the moving node attached to the moving object to perceive the entrance of the moving node attached to the moving object.

13. The method of claim 10, wherein the first WSN is a WSN of a first floor of a building, and the second WSN is a WSN of a second floor of a building.

* * * * *